Feb. 8, 1927.
A. SONNEFELD
PHOTOGRAPHIC OBJECTIVE
Filed June 1, 1923
1,616,765
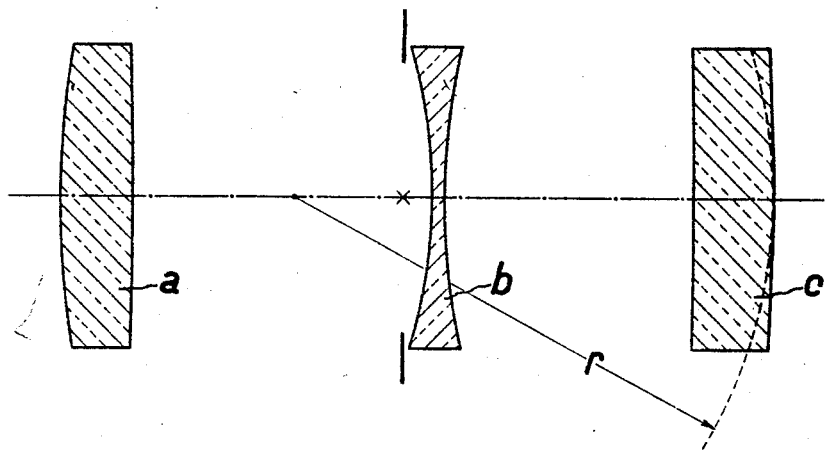
Inventor:
August Sonnefeld Patented Feb. 8, 1927.

1,616,765

UNITED STATES PATENT OFFICE.

AUGUST SONNEFELD, OF JENA, GERMANY, ASSIGNOR TO THE FIRM OF CARL ZEISS, OF JENA, GERMANY.

PHOTOGRAPHIC OBJECTIVE.

Application filed June 1, 1923, Serial No. 642,795, and in Germany June 10, 1922.

The present invention relates to photographic objectives consisting of three lenses separated by air-distance, and of which the two outer ones are collective and the middle one dispersive, i. e. objectives as described, e. g. in the patent specifications 540,122 and 721,240. In order to be able to keep with objectives of this kind having a great focal length and a large aperture the zonal errors of the spherical aberration within narrow limits, one of the surfaces of the dispersive lens has sometimes been deformed. The deformation of exactly this lens seemed to be of advantage inasmuch as the point of intersection of the principal rays of the objective always comes in the vicinity of the dispersive lens so that a deformation in this place will hardly affect the astigmatism. However, a deformation in this place has a detrimental effect inasmuch as zonal errors of the coma are thereby produced which cannot be obviated and already cause large figures of dispersion in the middle of the field of view.

According to the invention the deformation is carried out at the last lens surface of the objective although the elimination of the zones by means of deformation at this place is not without substantial effect upon other image defects. For, if prior to the deformation all image defects have been obviated, by the deformation of the last lens surface there arise defects of the curvature of the image field and of the astigmatism of approximately the same amount as the zonal error eliminated. However, in that case the coma is not affected by the deformation and an image field free from astigmatism and curvature may also be obtained if prior to the deformation the objective be corrected in such a way that along the principal rays the curvature of the image field according to the magnitude and sign assumes the same amount as the spherical aberration of those incoming axially parallel rays which have the same place of incidence at the surface facing the image as the principal rays at any one time. Besides, when computing, it is easily possible to pursue the changes in the path of the image-producing rays caused by the deformation. In addition, the advantage important for the working is obtained that the last lens surface of the objective is easily accessible. For, when carrying out the deformation, it will frequently be requisite to examine the objective respecting the improvement achieved in the elimination of the image defects. If, as hitherto, the deformation be carried out at the dispersive lens, it is necessary, prior to each examination of the objective, to compose the objective and to dismount the same after each examination. This procedure is all the more wearisome as each time the single lenses of the objective must be carefully centred relatively to one another because especially the objectives of the present kind are extremely sensitive to errors of centering. By deforming, however, the last lens surface, two lenses always remain centred relatively to each other, hence in that case the amount of work required for the examination is considerably smaller.

The annexed drawing shows a constructional example of the invention in a section.

In this example the objective consists of three single lenses $a$, $b$ and $c$. With the last (deformed) surface of the objective there is denoted by a dotted arc of circle the spherical surface which comes in contact with the deformed surface in its vertex and whose radius of curvature agrees with that of the deformed surface in the vertex. As may be seen from the drawing, the deformation (shown greatly exaggerated) consists in a thickening of the lens $c$ towards the margin.

I claim:

Photographic objective consisting of three lenses separated by air-distance, the two outer of these lenses being collective and the middle one dispersive, and the last surface of the said objective being deformed.

AUGUST SONNEFELD.